United States Patent [19]
Hieda et al.

[11] Patent Number: 5,543,836
[45] Date of Patent: Aug. 6, 1996

[54] WHITE BALANCE USING COMBINED FEEDBACK AND EXTERNAL COLOR INFORMATION FOR CONTROL

[75] Inventors: Teruo Hieda; Masao Suzuki; Hitoshi Narita, all of Kanagawa-ken, Japan

[73] Assignee: Canon Kabushiki Kaisha, P.C., Tokyo, Japan

[21] Appl. No.: 360,183

[22] Filed: Dec. 20, 1994

Related U.S. Application Data

[63] Continuation of Ser. No. 242,149, Apr. 14, 1994, abandoned, which is a continuation of Ser. No. 98,217, Jul. 28, 1993, abandoned, which is a continuation of Ser. No. 799,718, Nov. 26, 1991, abandoned, which is a continuation of Ser. No. 503,144, Mar. 30, 1990, abandoned, which is a division of Ser. No. 311,434, Feb. 16, 1989, Pat. No. 4,931,856, which is a continuation of Ser. No. 175,670, Mar. 21, 1988, abandoned, which is a continuation of Ser. No. 80,253, Jul. 27, 1987, abandoned, which is a continuation of Ser. No. 686,712, Dec. 27, 1984, abandoned.

[30] Foreign Application Priority Data

Dec. 28, 1983  [JP]  Japan .................................. 58-245909

[51] Int. Cl.$^6$ .............................. H04N 9/73; H04N 9/07
[52] U.S. Cl. ............................................ 348/223; 348/655
[58] Field of Search .................................... 348/223, 655, 348/222; H04N 9/07, 9/73

[56] References Cited

U.S. PATENT DOCUMENTS

| | | | |
|---|---|---|---|
| 4,700,219 | 10/1987 | Tanaka et al. | 358/41 |
| 4,931,856 | 6/1990 | Hieda et al. | 358/44 |

FOREIGN PATENT DOCUMENTS

| | | | |
|---|---|---|---|
| 57-13878 | 1/1982 | Japan | 358/29 C |
| 62-284594 | 12/1987 | Japan | H04N 9/73 |
| 63-141488 | 6/1988 | Japan | H04N 9/73 |

*Primary Examiner*—Safet Metjahic
*Assistant Examiner*—Cheryl Cohen
*Attorney, Agent, or Firm*—Anderson Kill Olick & Oshinsky, P.C.

[57] ABSTRACT

The disclosed image sensing apparatus includes a first circuit for forming a first signal to control gains of various color signals included in the outputs of an image sensing device in accordance with the levels of the various color signals, a second circuit for forming a second signal to control the gains of the various color signals in accordance with a color temperature of an object to be photographed, and a gain control circuit for controlling and determining the gains of the various color signals by mixing the first and second signals formed by the first and second circuits, in which a high accurate white balance adjustment is effected and the variation of the color temperature of the object is followed.

8 Claims, 7 Drawing Sheets

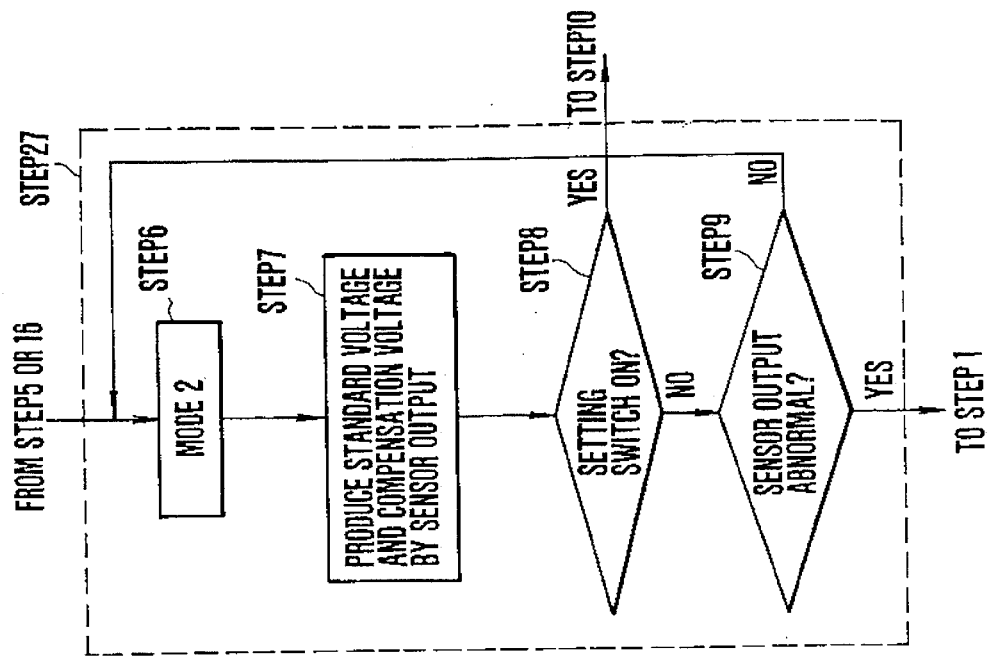
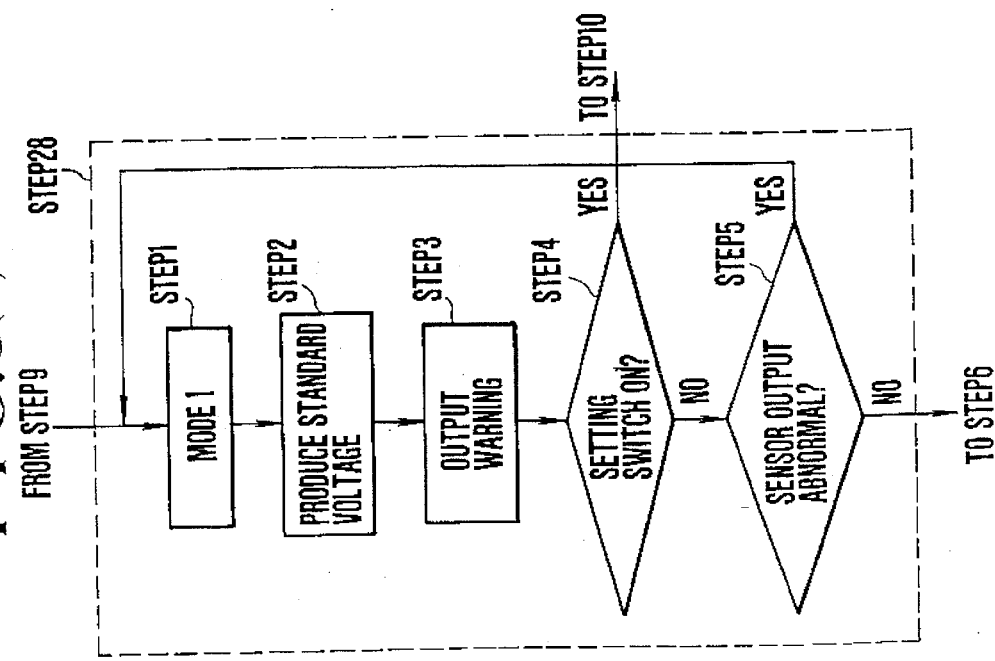

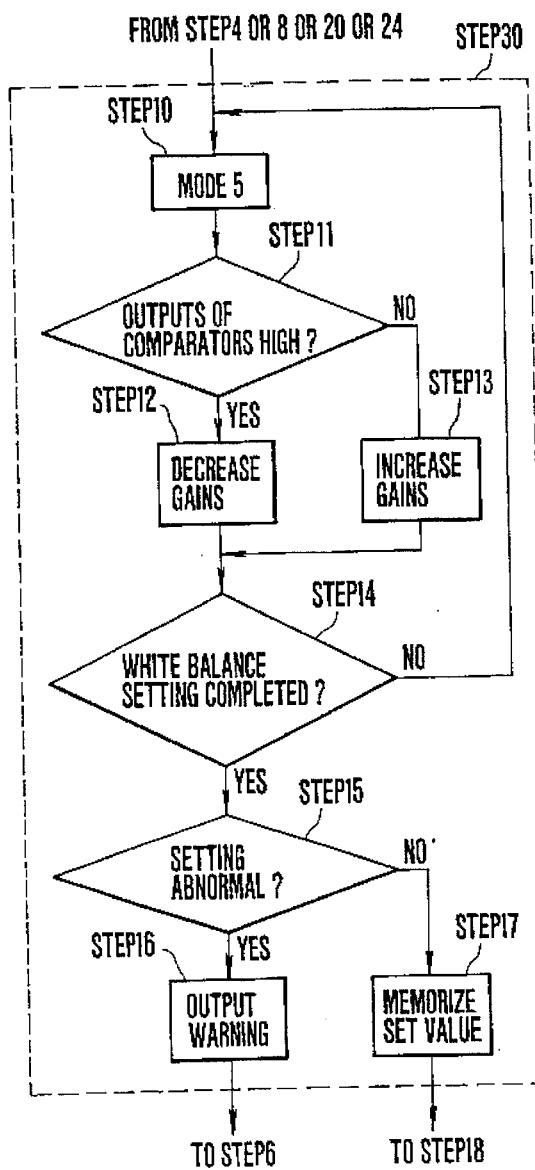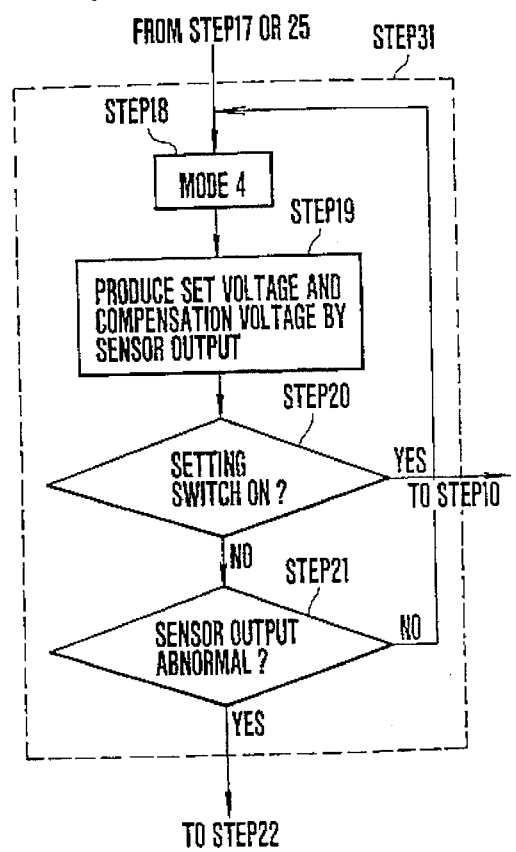
FIG.6(c)
FIG.6(d)

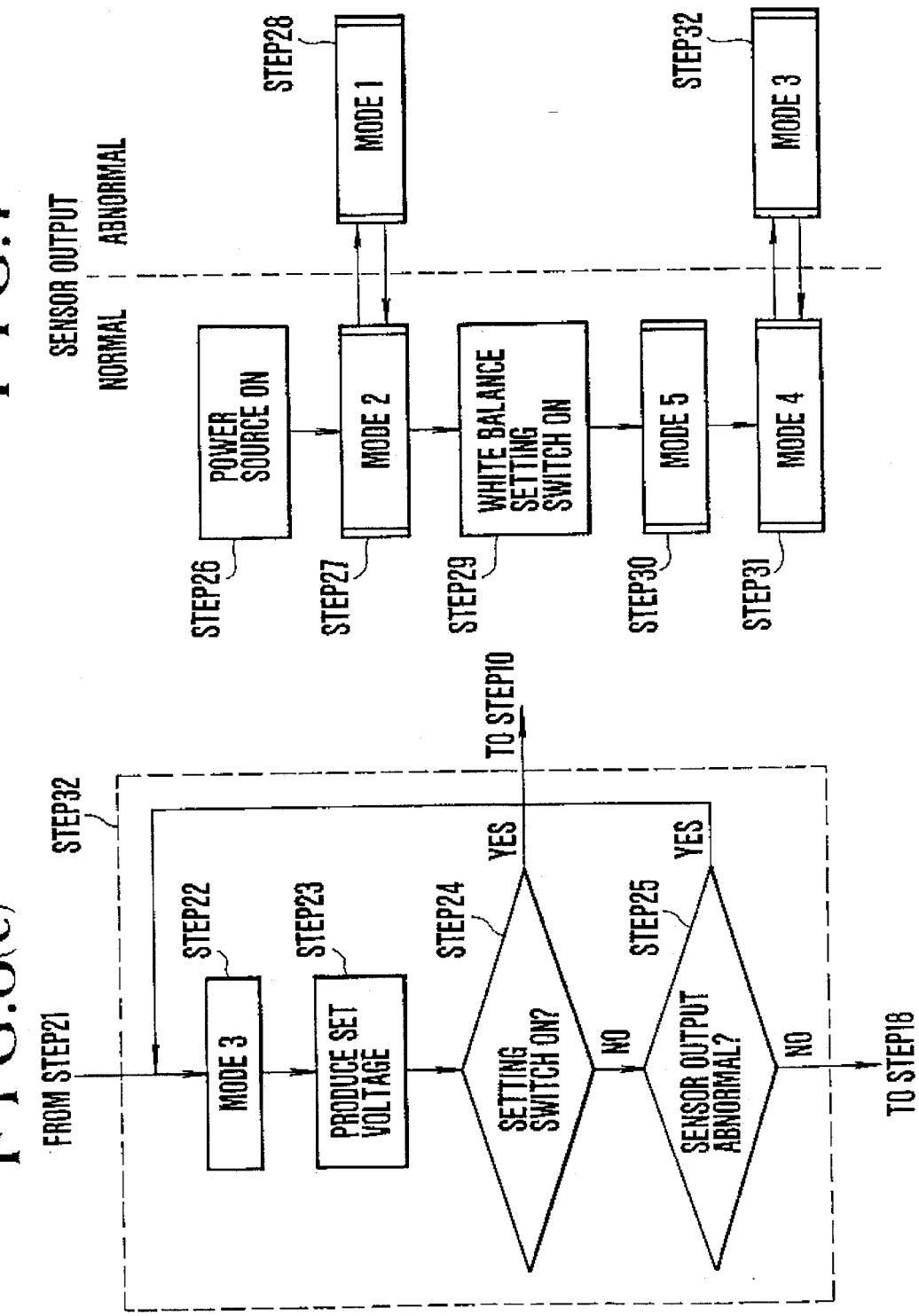

WHITE BALANCE USING COMBINED FEEDBACK AND EXTERNAL COLOR INFORMATION FOR CONTROL

This is a continuation application of Ser. No. 08/242,149, filed Apr. 14, 1994, now abandoned, which in turn is a continuation application of Ser. No. 08/098,217, filed Jul. 28, 1993, now abandoned, which in turn is a continuation application of Ser. No. 07/799,718, filed Nov. 26, 1991, now abandoned, which in turn is a continuation application of Ser. No. 07/503,144, filed Mar. 30, 1990, now abandoned, which is a divisional application of Ser. No. 07/311,434, filed Feb. 16, 1989, now U.S. Pat. No. 4,931,856, issued Jun. 5, 1990; which in turn is a continuation application of Ser. No. 07/175,670, filed Mar. 21, 1988, now abandoned, which in turn is a continuation application of Ser. No. 07/080,253, filed Jul. 27, 1987, now abandoned, and which in turn is a continuation application of Ser. No. 06/686,712, filed Dec. 27, 1984, now abandoned.

BAKCGROUND OF THE INVENTION

1. Field of the Invention

The present invention relates to a color image sensing apparatus having an improved automatic white balance adjustment device.

2. Description of the Prior Art

In color television cameras, particularly, portable television cameras for home use, the small-sized, light-weight and high-performance ones have been realized according to the recent advance of electric circuit technology. Particularly, according to the realization of non-adjustment of a circuit and automation of operation, color television cameras by which any person having no special knowledge can easily take a photograph, have been manufactured and have come into wide use.

The most popular error in taking a photograph by such a color television camera is a failure of color adjustment, particularly, white balance adjustment. Unless a color television camera is adjusted in such a way that when a white object is photographed the ratio of components of the three primary colors, that is, red (R), green (G) and blue (B), which are contained in an output television signal, is 1:1:1, color-reproduction of an image to be reproduced on a television screen is degraded. Therefore, white balance adjustment for adjusting gains of color signals in accordance with illuminating light at a photographed place prior to photography is necessary. Heretofore, the white balance adjustment was effected such that an operator directly adjusted a circuit constant or an optical filter by using a monitor television or a waveform monitor or the like. Recently, automatic adjustment, the so-called automatic white balance adjustment, is effected. However, in the conventional automatic white balance adjustment, there are a large error in some conditions of use and the possibility of an erroneous operation. When an average person effects the adjustment, a satisfactory picture cannot be obtained in many cases. The particular drawbacks are as follows:

(1) An operator is apt to forget setting white balance adjustment.

(2) A large error occurs unless white balance adjustment is set for a white object.

(3) When the condition of illumination changes after setting, white balance adjustment does not follow unless resetting is effected.

SUMMARY OF THE INVENTION

It is an object of the present invention to eliminate the above drawbacks of the prior art and provide an image sensing apparatus in which an operator is able to easily adjust white balance with high accuracy and without an erroneous operation.

It is another object of the present invention to provide an image sensing apparatus capable of high accurate white balance adjustment and capable of following the variation of color temperature.

It is a further object of the present invention to provide an image sensing apparatus capable of white balance adjustment having little error according to the variation of conditions of an object to be photographed.

To attain these objects, according to an embodiment of the present invention, an image sensing apparatus includes a first circuit for forming a signal to control gains of various color signals included in the outputs of an image sensing device in accordance with the levels of the various color signals, a second circuit for forming a signal to control the gains of the various color signals in accordance with a color temperature of an object to be photographed, and a gain control circuit for controlling and determining the gains of the various color signals in response to a combined output of the signals formed by the first and second circuits. In this image sensing apparatus, a high color-reproduction can be performed with a simple operation, and an error of white balance adjustment little increases even if a photographic condition changes. Furthermore, according to another embodiment of the present invention, the image sensing apparatus also includes a microcomputer for controlling the combined output of the signals of the first and second circuits. Therefore, an operator can take a photograph in the best condition even if he erroneously operates the apparatus. Accordingly, a handy color television camera in which a failure little occurs can be constructed.

Other objects and features of the present invention will become apparent from the following detailed description of the preferred embodiments thereof with reference to the accompanying drawings.

BRIEF DESCRIPTION OF THE DRAWINGS

FIGS. 6(a) through 6(e) are flow charts illustrating processes of the various modes.

FIG. 7 is a flow chart illustrating an operation of automatic white balance adjustment.

DETAILED DESCRIPTION OF THE PREFERRED EMBODIMENTS

Figure 1:
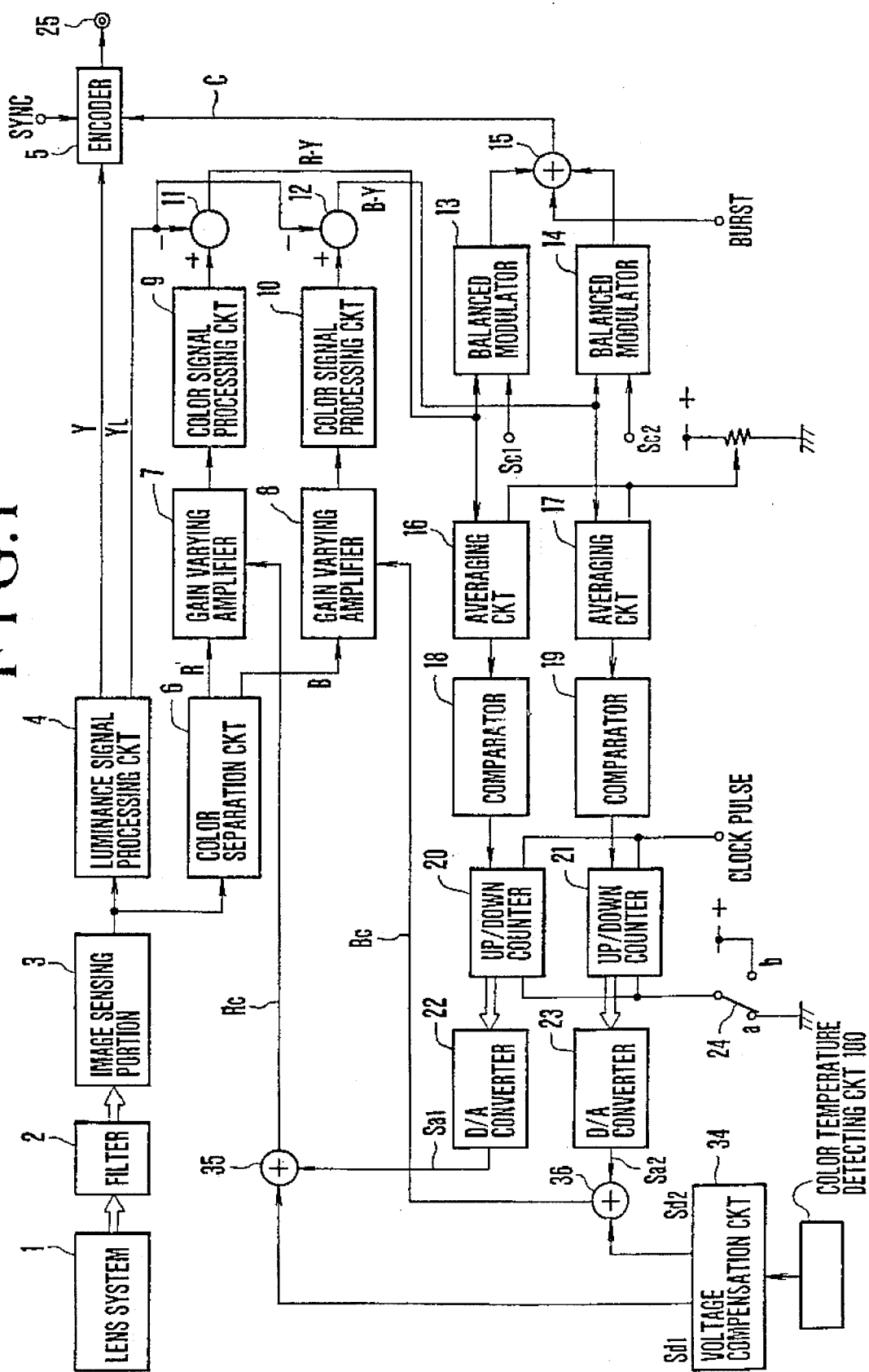
FIG. 1 is a circuit block diagram of a color image sensing apparatus in which an automatic white balance adjustment device is used in accordance with a preferred embodiment of the present invention.

FIG. 1 shows a first embodiment of a color image sensing apparatus according to the present invention. In FIG. 1, the color image sensing apparatus includes a photographic lens system 1, a color temperature converting optical filter 2, an image sensing portion 3 having an image sensing tube and a preamplifier and operating as image sensing means for converting an optical image into an electrical picture signal, a luminance signal processing circuit 4 for processing a luminance signal Y, a television signal encoder 5, a color separation circuit 6 for separating a red signal R and a blue signal B, gain varying amplifiers 7 and 8 operating as gain control means for varying and controlling gains of the signals R and B, respectively, color signal processing circuits 9 and 10 for processing the signals R and B, respectively, subtracter circuits 11 and 12 for forming a difference signal R-Y of the signals R and Y and a difference signal B-Y of the signals B and Y, respectively, balanced modulators 13 and 14 for balance-modulating the signals R-Y and B-Y, respectively, an adder circuit 15, averaging circuits 16 and 17 for detecting mean values of the signals R-Y and B-Y, respectively, comparators 18 and 19 operating as distinction means for comparing the mean values of the signals R-Y and B-Y with a reference zero level, respectively, up/down counters 20 and 21, D/A converters 22 and 23 for generating voltages to vary the gains of the signals R and B, respectively, an automatic white balance setting switch 24, a picture signal output terminal 25, a voltage compensation circuit 34 operating as compensation means, a color temperature detecting circuit 100, and adder circuits 35 and 36.

An optical image which has passed through the lens system 1 is converted into color temperature by the optical filter 2 and is further converted into an electrical signal by the image sensing portion 3. A luminance component of the electrical signal is processed by the luminance signal processing circuit 4 to become a luminance signal Y and a low band luminance signal $Y_L$. On the other hand, a color component of the electrical signal is separated into a red signal R and a blue signal B by the color separation circuit 6. The signals R and B which have passed through the gain varying amplifiers 7 and 8 are processed by the color signal processing circuits 9 and 10 and are subject to subtraction of the low band luminance signal $Y_L$ to become color-difference signals R-Y and B-Y, respectively. The signals R-Y and B-Y are balance-modulated with sub-carriers SC1 and SC2 by the balanced modulators 13 and 14, respectively, and are added up by the adder circuit 15 to become a chrominance signal C. The chrominance signal C is combined with the luminance signal Y to become a picture signal.

Furthermore, the color-difference signals R-Y and B-Y are averaged by the averaging circuits 16 and 17 and are compared with the zero level by the comparators 18 and 19, respectively.

When a white balance button (not shown) is depressed with the apparatus turned toward a white object, the automatic white balance setting switch 24 is connected to a terminal "a" to enable the up/down counters 20 and 21 to operate. The up/down counters 20 and 21 counts clock pulses in such a way that "up" and "down" are controlled in accordance with "high" and "low" of outputs of the comparators 18 and 19. The outputs of the up/down counters 20 and 21 are converted into analog voltages by the D/A converters 22 and 23 and are supplied to the adder circuits 35 and 36 to control gains to be produced by the gain varying amplifiers 7 and 8, respectively. An automatic white balance adjustment device of the present invention is essentially composed of a closed loop circuit including the gain varying amplifiers 7 and 8 through the D/A converters 22 and 23, and operates in such a way that the mean values of the color-difference signals R-Y and B-Y become zero. Therefore, the automatic white balance adjustment device is set such that the chrominance signal C is extinguished and the white object is sensed in a real white state.

On the other hand, the voltage compensation circuit 34 operating as compensation means is controlled on the basis of data detected by the color temperature detecting circuit 100 operating as detection means for detecting the state of an object to be photographed, such as color temperature, luminance, etc. The voltage compensation circuit 34 forms a compensation signal Sd1 for the signal R-Y and a compensation signal Sd2 for the signal B-Y. The compensation signals Sd1 and Sd2 are added to outputs Sa1 and Sa2 of the D/A converters 22 and 23 by the adder circuits 35 and 36, to become total gain control signals Rc and Bc, respectively.

In the up/down counters 20 and 21, gain control signals for controlling gains to be produced by the amplifiers 7 and 8 at the time of a predetermined color temperature T0 is preset.

It is to be noted that the image sensing means may be a solid-state image sensor.

Figure 2:
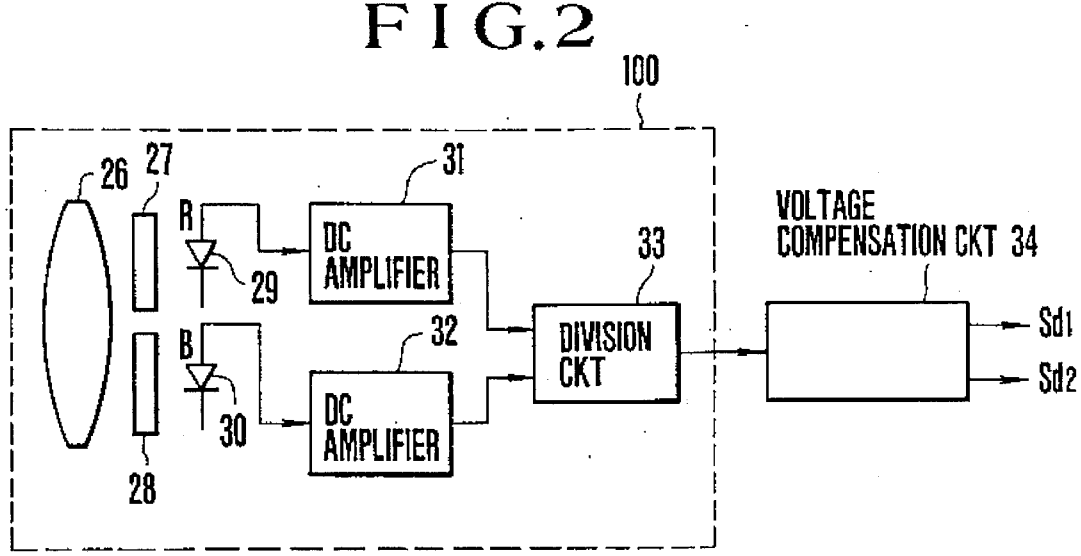
FIG. 2 is a circuit block diagram of parts of the color image sensing apparatus of FIG. 1.

FIG. 2 shows an example of the construction of the color temperature detecting circuit 100 of FIG. 1. The detecting circuit 100 includes a lens 26 for receiving ambient light, a red filter 27, a blue filter 28, photo-diodes 29 and 30, DC amplifiers 31 and 32, an analog division circuit 33 for an operation of R/B. The voltage compensation circuit 34 generates compensation signals Sd1 and Sd2 to compensate the gains in the R-channel and B-channel of the picture signal. Ambient light which has passed through the lens 26 is supplied to the photo-diodes 29 and 30 through the red filter 27 and the blue filter 28 to become voltages corresponding to red and blue components of the ambient light. These voltages are amplified by the DC amplifiers 31 and 32 and are divided by each other by the analog division circuit 33 to become the ratio between the blue component and the red component. In response to this ratio, the voltage compensation circuit 34 forms the compensation signals Sd1 and Sd2 to control the gain-varying amplifiers 7 and 8.

Figure 3:
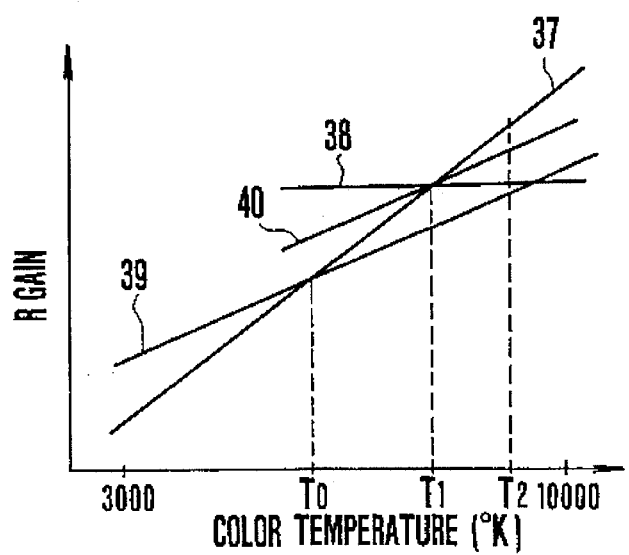
FIG. 3 is a diagram for an explanation of the characteristic of compensation for color temperature according to the present invention.

FIG. 3 shows the characteristic of an operation of the embodiment of the present invention. In FIG. 3, the vertical axis identifies a gain produced by the gain varying amplifier 7 for the signal R. The horizontal axis identifies color temperature. Reference numeral 37 identifies the optimum compensation curve, 38 identifies the gain compensation characteristic curve of the prior art in which the amplifiers 7 and 8 are controlled only by the signals Sa1 and Sa2, 39 identifies the gain compensation characteristic curve of the prior art in which the amplifiers 7 and 8 are controlled only by the signals Sd1 and Sd2, and 40 identifies the gain compensation characteristic curve of the present invention.

In the gain compensation characteristic curve 38 of the prior art, the compensation is accurate near a color temperature T1 at the time of setting white balance. However, for example, when a color temperature of illuminating light changes from T1 to T2, an error increases unless the white balance is reset for the color temperature T2.

In the gain compensation characteristic curve 39 of the prior art, an error increases as a color temperature goes away from the standard-setting point T0.

In the gain compensation characteristic-curve 40 of the present invention, the compensation is extremely accurate near the color temperature T1 at the time of setting White balance. Furthermore, even when a color temperature of illuminating light changes from T1 to T2, an error little increases, since the detecting circuit 100 follows the change to compensate the gains produced by the amplifiers 7 and 8.

Furthermore, even if an operator forgets setting white balance, the gains are compensated by use of the gain compensation characteristic curve 39, since the outputs of the up/down counters 20 and 21 are preset at the standard setting point T0. Accordingly, a great failure can be prevented.

In the above, the gain compensation for the signal R has been described. An explanation of the gain compensation for the signal B is the same as the above.

Figure 4:
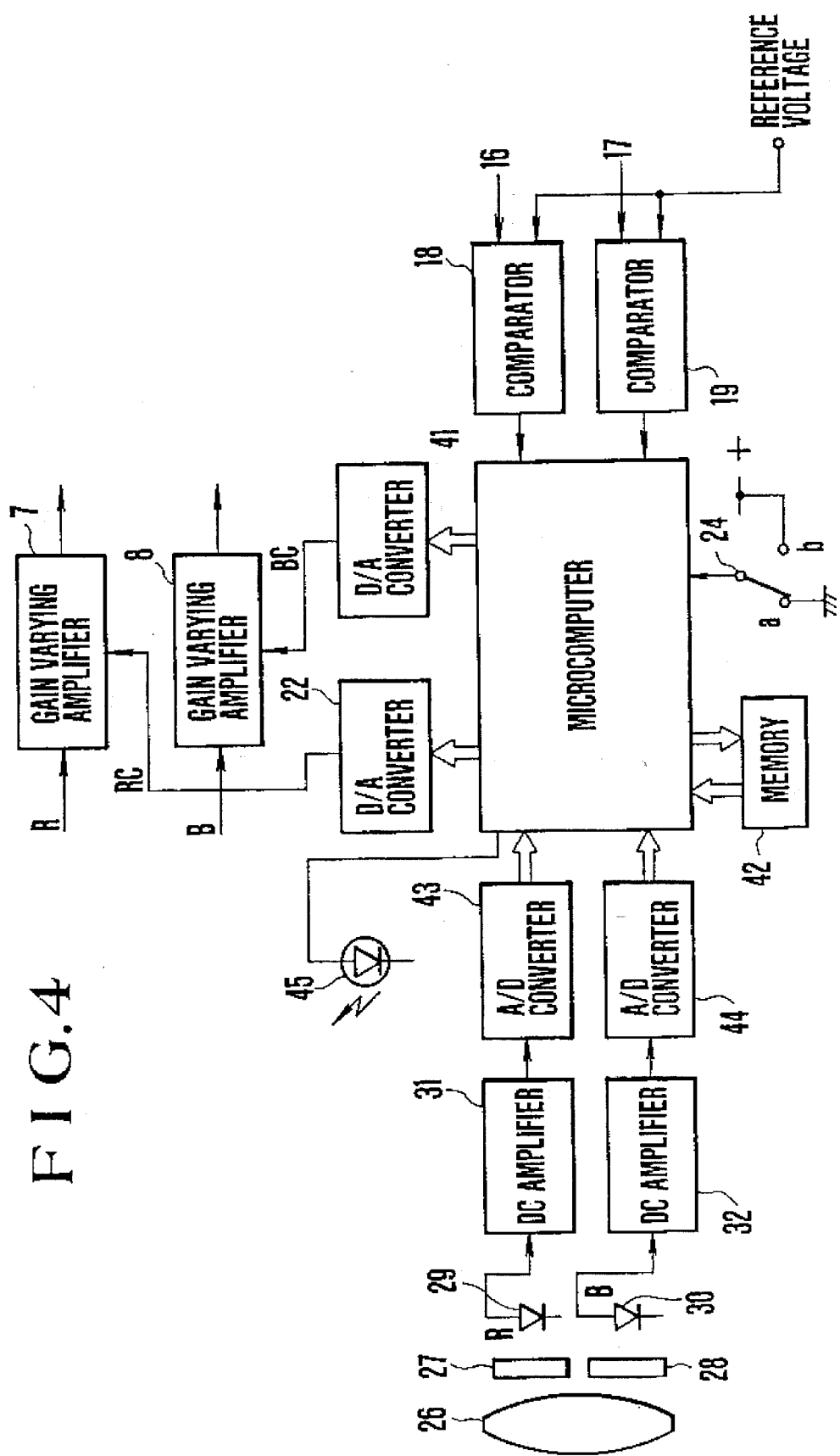
FIG. 4 is a circuit block diagram showing another embodiment of the present invention.

FIG. 4 shows a second embodiment of the present invention. In FIG. 4, outputs of the comparators 18 and 19, outputs of A/D converters 43 and 44, the automatic white balance setting switch 24, a memory 42, a warning light emitting diode 45, the D/A converters 22 and 23, etc. are connected to a microcomputer 41.

An example of the operation of the microcomputer 41 of FIG. 4 is described in the following with reference to the transfer diagram of FIG. 5.

The operation of the microcomputer 41 is divided into the following five modes:
(a) Mode 1 (standard setting state):
A mode in which the gains in the R- and B- channels are fixed to the set value corresponding to the standard color temperature T0. This set value is, for example, a value corresponding to color temperature 4000° K.–5000° K.
(b) Mode 2 (standard following state):
A mode in which the output of the standard set value in the mode 1 is compensated in accordance with the outputs of the A/D converters 43 and 44.
(c) Mode 3 (setting-state):
A mode in which the gains in the R- and B- channels are fixed to a value at the time of the last setting of white balance which was effected by the switch 24, and are not compensated by the detecting circuit 100.
(d) Mode 4 (set value following state):
A mode in which the value at the time of the setting of white balance in the mode 3 is compensated in accordance with the outputs of the A/D converters 43 and 44.
(e) Mode 5 (white balance setting operation):
A mode in which a white balance setting operation is effected such that the color-difference signal becomes zero by detecting that the white balance setting switch 24 is connected to the terminal "a" and by varying the gains in the R- and B- channels during this time.

Figure 5:
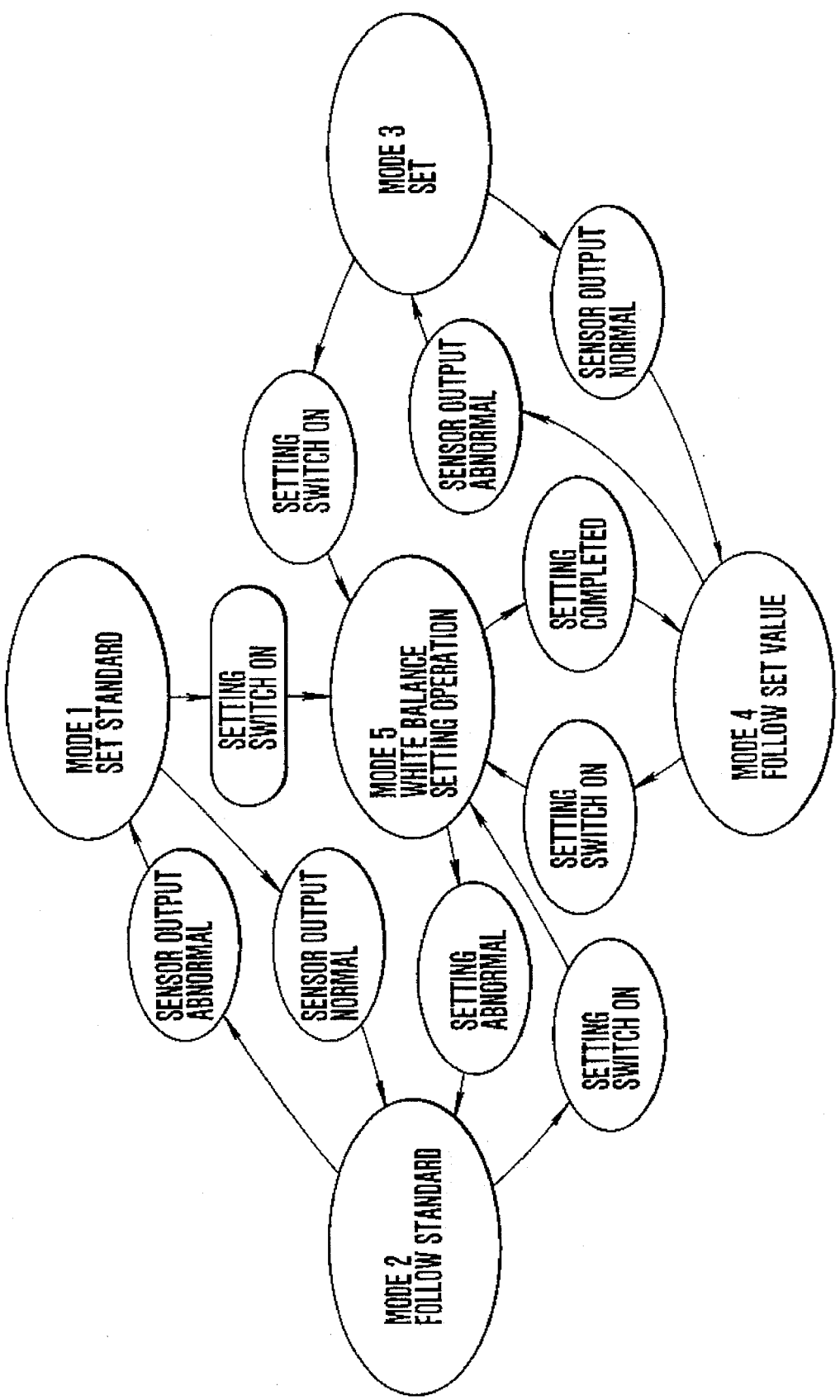
FIG. 5 is a diagram for an explanation of the transfer of various modes in a microcomputer.

In FIG. 5, sensor output abnormal" means the state in which the detecting circuit 100 does not normally detect because of eclipse of ambient light, such as at least one of the outputs of the photo-diodes 29 and 30 is lower than a predetermined value, or the ratio of two outputs is greater or less than a predetermined value.

"Setting abnormal" means the state in which the color-difference signals R-Y and B-Y cannot be adjusted to become zero within the varying range of the gains produced by the gain varying amplifiers 7 and 8.

"Setting completed" means the state in which a white balance setting has completed, that is, for example, outputs of the comparators 18 and 19 are inverted in accordance with changes of the lowest bits of the D/A converters 22 and 23, and the mean value of the color-difference signal has become about zero.

An example of the transfer operation is described in the following.

As shown in FIG. 5, the state of the white balance setting switch 24 and the abnormality or normality of the sensor output are always watched. The operation of the microcomputer 41 shifts to another mode as soon as the state changes.

For example, when the white balance setting switch 24 is not closed, the operation is in the mode 1 or 2. The modes 1 and 2 change to each other depending upon the abnormality and normality of the sensor output. In this state, when the white balance setting switch 24 is closed, the operation shifts to the mode 5 and the gains of the amplifiers 7 and 8 are controlled so that the mean value of the color-difference signal becomes about zero. When this control has been completed, the operation automatically shifts to the mode 4 and the gains are compensated in accordance the outputs of the color temperature detecting circuit 100. When the sensor output is abnormal, the operation shifts to the mode 3.

FIGS. 6(*a*) through 6(*e*) are flow charts regarding a change of the operation between the modes 1 to 5. In the following, the operation is described in order of the step number thereof.

Step 1: The operation comes into the mode

Step 2: Standard voltages to control the gains of the amplifiers 7 and 8 so that the color-difference signal becomes zero at the color temperature of 4500° K., are produced. In response to the standard voltages, the gains to be produced by the amplifiers 7 and 8 are controlled.

Step 3: The warning light emitting diode 45 is lit or turned on and off to represent the abnormality of the sensor output.

Setp 4: The decision is made: "is the white balance setting switch 24 closed?" If the answer to this decision is yes, the operation shifts to the mode 5 and advances to a step 10 (to be described later). If the answer is no, the operation advances to a step 5.

Setp 5: The decision is made: "is the sensor output abnormal?" by comparing the ratio of the outputs of the photodiodes 29 and 30 or the output level thereof with a predetermined value. If the answer to this decision is yes, the operation returns to the step 1 and comes into the mode 1. If the decision is no, the operation advances to a step 6.

Step 6: The operation shifts to the mode 2.

Step 7: The standard voltages are produced and added to the outputs of the A/D converters 43 and 44 to become control signals. In response to the control signals, the gains of the amplifiers 7 and 8 are controlled.

Step 8: The decision is made: "is the white balance setting switch 24 closed?" If the answer to this decision is yes, the operation advances to a step 10. If the answer is no, the operation advances to a step 9.

Step 9: The decision is made: "is the sensor output abnormal?" If the answer to this decision is no, the operation returns to the step 6. If the answer is yes, the operation shifts to the step 1.

Step 10: The operation shifts to the mode 5.

Setp 11: The decision is made: "are the outputs of the comparators 18 and 19 each at a high level?" If the answer to this decision is yes, the operation advances to a step 12. If the answer is no, the operation shifts to a step 13.

Step 12: The gain of the amplifier 7 or 8 is decreased.

Setp 13: The gain of the amplifier 7 or 8 is increased.

Setp 14: The decision is made: "has a white balance setting been completed?" If the answer to this decision is no, the operation returns to the step 10. If the answer is yes, the operation advances to a step 15.

Step 15: The decision is made: "is the setting abnormal?" If the answer to this decision is yes, that is, in a case where the color-difference signal does not become zero even when the gains of the amplifiers 7 and 8 have been controlled ad described above, the operation advances to a step 16. If the answer is no, the operation advances to a step 17.

Step 16: The warning light emitting diode 45 is lit or turned on and off to represent the abnormality. Then, the operation shifts to the step 6.

Setp 17: The set values are memorized by the memory 42, and then the operation advances to a step 18.

Step 18: The operation comes into the mode 4.

Step 19: The set voltage values memorized by the memory and the outputs of the A/D converters 43 and 44 are added up and then supplied to the D/A converters 22 and 23 to control the gains of the amplifiers 7 and 8, respectively.

Step 20: The decision is made: "is the white balance setting switch 24 closed?" If the answer to this decision is yes, the operation returns to the step 10. If the answer is no, the operation advances to a step 21.

Step 21: The decision is made: "is the sensor output abnormal?" If the answer to this decision is no, the operation returns to the step 18. If the answer is yes, the operation shifts to a step 22.

Step 22: The operation comes into the mode 3.

Step 23: The microcomputer 41 produces the set voltage values memorized by the memory 42 to control the gains of the amplifiers 7 and 8 through the D/A converters 22 and 23.

Step 24: The decision is made: "is the white balance setting switch 24 newly closed?" If the answer to this decision is yes, the operation return to the step 10. If the answer is no, the operation shifts to a step 25.

Step 25: The decision is made: "is the sensor output abnormal?" If the answer to this decision is yes, the operation returns to the step 22. If the answer is no, the operation returns to the step 18.

FIG. 7 shows an example of the actual operation of the automatic white balance adjustment when a general object is photographed. In this example, assume that the white balance setting is not abnormal.

When an electrical power switch is turned on (Step 26), the operation comes into a subroutine of the mode 2 (Step 27). Depending upon the abnormality or normality of the sensor output, the operation changes between a subroutine of the mode 1 (Step 28) and the subroutine of the mode 2. When the white balance setting switch 24 is closed (Step 29), the operation comes into a subroutine of the mode 4 (Step 31) through a subroutine of the mode 5 (Step 30). The white balance adjustment in the subroutine of the mode 4 is most accurate. After that, the operation changes between a subroutine of the mode 3 (Step 32) and the subroutine of the mode 4.

The warning light emitting diode 45 is lit or turned on and off to warn an operator when the abnormality of the sensor output is detected in the subroutine of the mode 1 and when the abnormality of the setting is detected in the subroutine of the mode 5.

In the above embodiments of the present invention, when a particularly high color-reproduction is not necessary, a photographer does not need to operate anything. If the white balance setting switch is depressed, a high accurate white balance adjustment can be performed. Furthermore, even if the state of illuminating light is changed, since the operation follows to compensate the change, an error little increases. Furthermore, even if a photographer erroneously operates the camera, such as covers the lens 26 erroneously, a failure little occurs since the white balance adjustment is effected in a small error.

In the second embodiment, a microcomputer is used. However, the whole or part of the microcomputer may be replaced with a digital signal processing circuit having the same function.

Furthermore, a luminance signal level comparing output and an optical filter change detecting output may be supplied to the microcomputer. In this case, if a white balance setting is effected when the level of a luminance signal is lower than a predetermined value, and if an optical filter is changed to another after the white balance setting, a display for indicating a mode change or a display for warning is made. In addition to this, the gains of the amplifiers 7 and 8 may be compensated. For example, when the luminance level of an object is lower than the predetermined value, the color temperature is also considered low. Therefore, the gains of the amplifiers 7 and 8 are controlled by use of a predetermined set value corresponding to the low color temperature of 3000° K.

Furthermore, although a mode is automatically changed, a mode change switch may be provided for a photographer to manually change the mode.

Furthermore, many displays for the various warning may be provided. The operation state or warning may be displayed with letters on an electronic view finder or a display panel using a character generator etc.

Furthermore, part of the digital processing system may be replaced with an analog operation circuit.

Furthermore, a change of modes may be effected not momentarily but for a predetermined time smoothly, so that a sudden change of picture quality can be prevented.

Furthermore, one or two modes may be omitted from all the modes of the embodiment.

Furthermore, when the microcomputer is used, the memory 42 may be arranged to be energized even after the electrical power source is turned off, so that the operation can return to the last state when the electrical power source is turned on again.

As has been described above, in the color image sensing apparatus in which the automatic white balance adjustment devcie is used in accordance with the present invention, a high color-reproduction can be performed with a simple operation, and an error of white balance adjustment little occurs even if a photographic condition changes. Furthermore, when the microcomputer is used, an operator can take a photograph in the best condition even if he erroneously operates the appatus. Accordingly, a handy color television camera in which a failure littel occurs can be constructed.

What is claimed is:

1. An image sensing apparatus, comprising:
   a) color image sensing means;
   b) first means for forming a first signal to control a white balance of said color image sensing means on the basis of an output of the color image sensing means;
   c) color temperature detecting means for forming a second signal corresponding to a color temperature of an object; and
   d) control means for controlling the white balance of said color image sensing means by mixing the first signal and the second signal.

2. An image sensing apparatus according to claim 1, wherein said color temperature detecting means includes a plurality of color sensors.

3. An image sensing apparatus according to claim 2, wherein said plurality of color sensors include an R-color sensor and a B-color sensor.

4. An image sensing apparatus according to claim 1, and further comprising mixing ratio control means for controlling a mixing ratio of said control means by detecting whether one of the first signal and the second signal is out of a predetermined range.

5. An image sensing apparatus according to claim 4, wherein said mixing ratio control means is arranged to change over between the first signal and the second signal.

6. An image sensing apparatus according to claim 1, and further comprising means for holding said first signal.

7. An image sensing apparatus according to claim 1, wherein said control means includes gain control means.

8. An image sensing apparatus according to claim 7, wherein said gain control means is arranged to control a ratio of a plurality of colors contained in an output of said color image sensing means.

* * * * *

UNITED STATES PATENT AND TRADEMARK OFFICE
CERTIFICATE OF CORRECTION

PATENT NO. : 5,543,836

DATED : August 6, 1996

INVENTOR(S) : Teruo Hieda, et al.

It is certified that error appears in the above-identified patent and that said Letters Patent is hereby corrected as shown below:

On the title page, item:

{73} Assignee: Canon Kabushiki Kaisha, Tokyo, Japan

Signed and Sealed this

Twenty-fifth Day of March, 1997

Attest:

BRUCE LEHMAN

Attesting Officer

Commissioner of Patents and Trademarks